(12) United States Patent
Cadon et al.

(10) Patent No.: US 10,560,743 B2
(45) Date of Patent: Feb. 11, 2020

(54) METHOD OF DOWNLOADING AND UPDATING APPLICATIONS IN A TELEVISION RECEIVER/DECODER HOUSING

(75) Inventors: Claude-André Cadon, Maisons-Laffitte (FR); Stéphane Hergault, St Germain endaye (FR)

(73) Assignee: SAGEM COMMUNICATIONS SAS, Paris (FR)

( * ) Notice: Subject to any disclaimer, the term of this patent is extended or adjusted under 35 U.S.C. 154(b) by 0 days.

(21) Appl. No.: 12/528,837

(22) PCT Filed: Feb. 20, 2008

(86) PCT No.: PCT/FR2008/050286
§ 371 (c)(1),
(2), (4) Date: Feb. 18, 2010

(87) PCT Pub. No.: WO2008/113938
PCT Pub. Date: Sep. 25, 2008

(65) Prior Publication Data
US 2010/0138891 A1   Jun. 3, 2010

(30) Foreign Application Priority Data
Mar. 2, 2007 (FR) .................................. 07 53622

(51) Int. Cl.
*H04N 21/443* (2011.01)
*H04N 7/16* (2011.01)

(52) U.S. Cl.
CPC ................................. *H04N 21/443* (2013.01)

(58) Field of Classification Search
CPC ................................................... H04N 21/443
See application file for complete search history.

(56) References Cited

U.S. PATENT DOCUMENTS

| 4,595,951 A | 6/1986 | Filliman |
| 4,625,235 A | 11/1986 | Watson |
| 4,638,359 A | 1/1987 | Watson |
| 5,440,632 A | 8/1995 | Bacon et al. |

(Continued)

FOREIGN PATENT DOCUMENTS

| EP | 1 355 496 | 10/2003 |
| EP | 1 662 361 | 5/2006 |

(Continued)

OTHER PUBLICATIONS

International Search Report dated Sep. 12, 2008.

*Primary Examiner* — Mushfikh I Alam
(74) *Attorney, Agent, or Firm* — Pillsbury Winthrop Shaw Pittman LLP

(57) ABSTRACT

In order to maximize the availability of a television receiver/decoder housing, the invention enables the download of updates while said housing is being used. In order to do so, when the housing detects that an update is available, the housing allocates itself a portion of the acquisition resources of the update in order to store this update in a housing storage memory. Once the download is complete, the user can either activate the update or carry on using a former version of the housing application, the user thus being able to select a microcode version which is activated by default on switching on the receiver/decoder housing.

17 Claims, 1 Drawing Sheet

(56) References Cited

U.S. PATENT DOCUMENTS

| | | | |
|---|---|---|---|
| 5,635,979 A | 6/1997 | Kostreski et al. | |
| 5,666,293 A | 9/1997 | Metz et al. | |
| 5,768,539 A | 6/1998 | Metz et al. | |
| 5,822,324 A | 10/1998 | Kostresti et al. | |
| 5,966,637 A | 10/1999 | Kanungo et al. | |
| 5,978,855 A | 11/1999 | Metz et al. | |
| 6,084,643 A | 7/2000 | Kishtaka et al. | |
| 6,101,368 A | 8/2000 | Farnsworth | |
| 6,137,539 A | 10/2000 | Lownes et al. | |
| 6,141,002 A | 10/2000 | Kanungo et al. | |
| 6,169,843 B1 | 1/2001 | Lenihan et al. | |
| 6,282,709 B1* | 8/2001 | Reha | G06F 8/65 717/175 |
| 6,643,506 B1* | 11/2003 | Criss | G06F 8/65 455/418 |
| 7,051,325 B2* | 5/2006 | Choi et al. | 717/168 |
| 8,347,281 B2* | 1/2013 | Arsenault | G06F 8/65 717/168 |
| 2002/0169849 A1* | 11/2002 | Schroath | G06Q 30/0601 709/218 |
| 2003/0061604 A1 | 3/2003 | El Cock | |
| 2003/0204848 A1 | 10/2003 | Cheng | |
| 2004/0131020 A1 | 7/2004 | Smith | |
| 2004/0181790 A1* | 9/2004 | Herrick | G06F 8/60 717/168 |
| 2004/0193998 A1* | 9/2004 | Blackburn | G06F 8/67 714/763 |
| 2004/0221311 A1* | 11/2004 | Dow et al. | 725/52 |
| 2005/0120384 A1* | 6/2005 | Stone et al. | 725/132 |
| 2006/0035610 A1* | 2/2006 | Potrebic | H04H 40/18 455/178.1 |
| 2006/0041509 A1* | 2/2006 | Koerber | 705/51 |
| 2006/0112311 A1* | 5/2006 | Cobb | G06F 9/4411 714/16 |
| 2006/0174242 A1* | 8/2006 | Zhu et al. | 717/172 |
| 2006/0184928 A1* | 8/2006 | Hughes | G06F 8/20 717/168 |
| 2007/0061835 A1* | 3/2007 | Klein, Jr. | H04N 7/17354 725/25 |
| 2007/0067820 A1* | 3/2007 | Cha | 725/151 |
| 2007/0130585 A1* | 6/2007 | Perret | H04N 7/17318 725/46 |
| 2007/0169104 A1* | 7/2007 | Morita | G06F 8/65 717/170 |
| 2007/0174774 A1* | 7/2007 | Lerman | G06F 17/30017 715/723 |
| 2007/0220552 A1* | 9/2007 | Juster | H04N 21/4825 725/46 |
| 2009/0222875 A1* | 9/2009 | Cheng et al. | 725/147 |
| 2010/0205646 A1* | 8/2010 | Potrebic et al. | 725/151 |
| 2012/0144456 A1* | 6/2012 | Anderson | 726/4 |
| 2014/0165096 A1* | 6/2014 | O'Neil | H04N 21/4532 725/34 |

FOREIGN PATENT DOCUMENTS

| | | |
|---|---|---|
| FR | 2 822 329 | 9/2002 |
| WO | WO 9823088 | 5/1998 |

* cited by examiner

METHOD OF DOWNLOADING AND UPDATING APPLICATIONS IN A TELEVISION RECEIVER/DECODER HOUSING

This application claims priority of PCT International Application No. PCT/FR2008/050286 filed on Feb. 20, 2008. The contents of which are incorporated herein by reference.

FIELD OF THE INVENTION

An object of the invention is a method for downloading into a television receiver/decoder box.

The field of the invention is that of television receiver/decoder boxes. These boxes are also known as STBs (set top boxes). More specifically, the field of the invention is that of the updating of the application or applications implemented by these STBs. Such a program is most usually called firmware or microcode/microsoftware. The prefix "micro" should not give cause for confusion here. The memory size of such an application traditionally goes up to four Mb (megabytes) or even more.

BACKGROUND

It is an aim of the invention to enable the updating of an application of this kind while at the same time preserving the basics or even the totality of the STB functions during the updating.

In the prior art, the microcode of an STB is broadcast in the same way as a multimedia program. The STB is capable of detecting the broadcasting of such an update. When the availability of such an update is detected, in the best of cases, the STB asks the user if he or she wishes to update the microcode. If the answer is affirmative, the STB is unavailable throughout the time of the updating. Inasmuch as the bit rates allocated to the transmission of updates are low, such an update can take up to one hour. This is a problem because the availability of such an update is detected when the STB is powered on i.e. when its user wishes to use the functions of the STB.

The updating is indeed done by a loader program which overwrites the former microcode, thus making it impossible to execute it.

The invention resolves these problems by authorizing the coexistence of several microcodes in one STB. The microcode executed when the STB is started then depends on the parameterizing of the STB. Thus, when the availability of a new microcode is detected, one part of the resources of the STB is allocated to the recording of this new microcode beside the existing microcode or microcodes. The next time the device is turned on or when the recording is ended, the user is alerted to the availability of this new microcode and may choose it as a default microcode, i.e. the user can change the parameterization for the starting of the STB. In the invention, the STB has at least two input devices, one of these devices being allocated to the acquisition for recording of the new microcode. An input device is generally a data receiver device. An input device is for example a tuner, a CD/DVD reader, a serial port (RS232, USB etc).

SUMMARY OF THE INVENTION

An object of the invention therefore is a method for downloading an application into a television receiver/decoder comprising at least two data receiver devices, the following steps being implemented by the television receiver/decoder device:
  starting the television receiver/decoder upon being prompted by a user of the receiver,
  parameterizing the first receiver device as a function of an action of the user,
  detecting the availability of a new application,
  characterized in that it also comprises the following steps implemented by said television receiver/decoder device:
    the starting is according to a parameterizing of the television receiver/decoder relating to the application to be executed when starting,
    recording the new application on a backup medium on the basis of and depending on the availability of the second receiver device.

In one variant, the method of the invention is also characterized in that it comprises a step for updating a configuration memory whose content designates the application to be executed when the television receiver/decoder is started.

In one variant, the method of the invention is also characterized in that the first data receiver device is a tuner.

In one variant, the method of the invention is also characterized in that the second data receiver device is a tuner.

In one variant, the method of the invention is also characterized in that the second data receiver device is a connection port of a local peripheral from the list formed by at least the following: USB, Wifi, IEE1394.

In one variant, the method of the invention is also characterized in that the backup medium is a mass storage peripheral integrated into the television receiver/decoder.

In one variant, the method of the invention is also characterized in that the recording of the new application is secured at least by the authentication of the data source delivering the data corresponding to the application.

BRIEF DESCRIPTION OF THE DRAWINGS

The invention will be understood more clearly from the following description and the accompanying figures. These figures are given by way of an indication and in no way restrict the scope of the invention. Of these figures.

DETAILED DESCRIPTION

Figure 1:
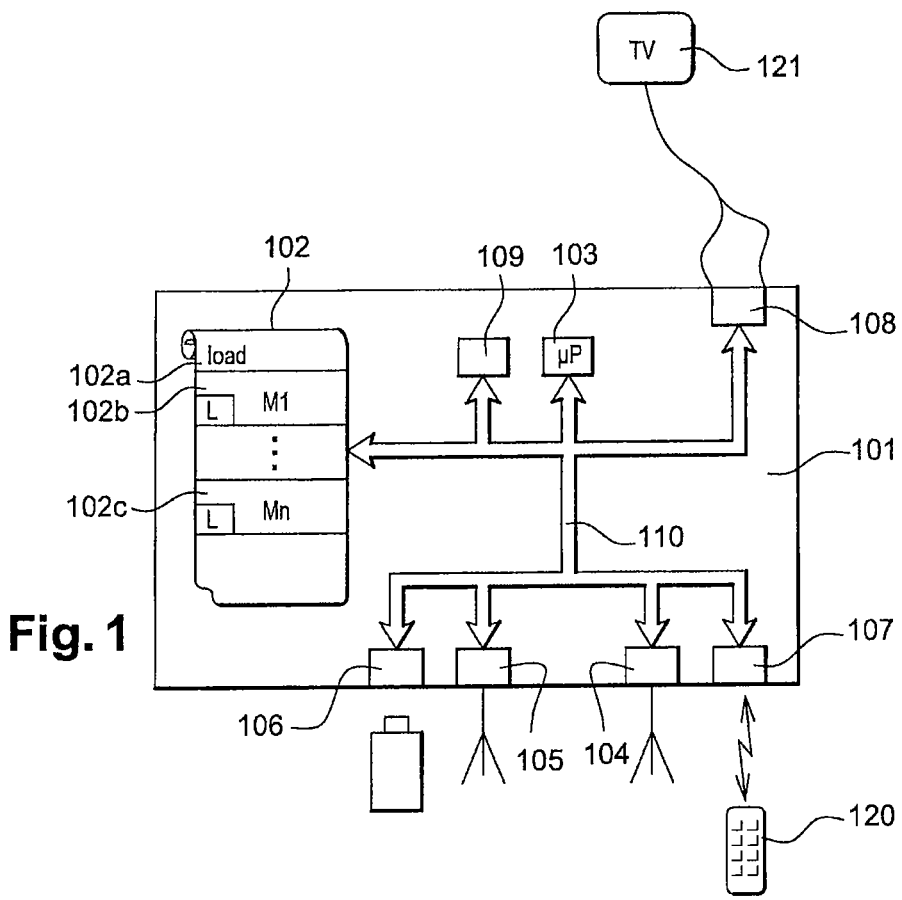
FIG. 1 shows means for implementing the method according to the invention.

FIG. 1 shows a television receiver/decoder device 101 here below called the STB 101.

The STB 101 has a program memory 102 comprising instruction codes corresponding to the functions implemented by the STB. These instruction codes are executed by a microprocessor 103 of the STB 101. In general, in this description, when an action is attributed to a device, this action is actually performed by a microprocessor of this device controlled by instruction codes recorded in a memory of this device.

FIG. 1 shows that the memory 102 has several zones, each of these zones corresponding here to an application. This description presents the memory 102 as a unit memory. It may be otherwise in practice as shall be illustrated here below.

The memory 102 has a zone 102a comprising instruction codes corresponding to a starting sequence of the STB 101. Typically, these instruction codes are recorded in a read-only memory of the STB 101 and/or on a dedicated memory electronic component.

The memory 102 has a zone 102b comprising instruction codes corresponding to a version of the microcode of the STB 101. In the invention, the memory 102 comprises at least one second zone 102c of the same type as the zone 102b. The zones 102b and 102c correspond to two different versions of the microcode of the STB 101. These differences correspond either to updates or to versions comprising different functions.

The zones 102b and 102c are recorded on a mass storage unit, for example a hard disk drive, of the STB 101.

The zones 102b and 102c each have a zone comprising instruction codes corresponding to the starting of the STB 101 and comprising instruction codes enabling the STB 101 to record a new version of the microcode from a data source.

FIG. 1 shows that the STB 101 has several data sources. Here, a data source is a device by which the STB 101 can access a new version of the microcode.

FIG. 1 shows that the STB 101 has at least one tuner 104 enabling the STB 101 to receive and decode radio broadcast signals corresponding to the broadcasting of multimedia programs and the broadcasting of a new version of the microcode.

In one variant of the invention, the STB 101 has a second tuner 105 identical to the tuner 104.

In one variant of the invention, the STB 101 has a USB port 106 used to connect a USB storage peripheral to the STB 101.

In yet another variant, the STB 101 has a DVD player that is not shown.

FIG. 1 again shows that the STB 101 has circuits 107 for receiving control signals sent by a remote control unit 120.

FIG. 1 again shows that the STB 101 has circuits 108 for connecting the STB 101 to a television set 121.

FIG. 1 again shows that the STB 101 has a configuration memory 109 for recording a configuration of the STB 101. This configuration has at least one identifier of a zone of the memory 102 corresponding to the microcode that has to be implemented when starting the STB 101.

The elements 102 to 109 are interconnected by a bus 110.

Figure 2:
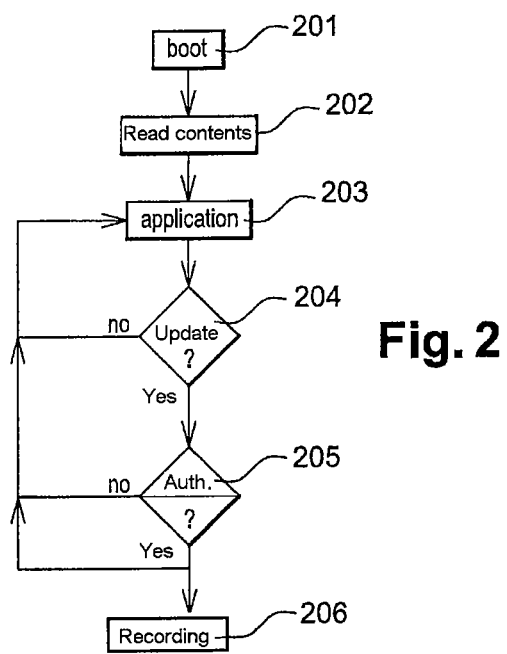
FIG. 2 shows steps of the method according to the invention.

FIG. 2 shows a preliminary step 201 in which a user of the STB 101 boots it or takes it out of standby mode. This is done for example through the remote control unit 120.

During the step 201, the STB 101 executes the instruction codes recorded in the memory 102a. At a point in time in this execution corresponding to a step 202 following the step 201, the STB 101 reads the contents of the memory 109 to find therein the identifier of the zone of the memory 102 comprising the microcode to be executed. Such an identifier is for example an address in the memory 102 corresponding to the first instruction code of the microcode to be executed. In another example, the memory 102 is divided into continuously numbered blocks, each block enabling the recording of a full version of the microcode. In this version, the identifier is a block number.

This identifier is found because it is situated at a predetermined location of the memory 102. The knowledge of this location is then part of the instruction codes of the zone 102a. In other words, this location is determined when designing and compiling instruction codes of the zone 102a.

In a step 203 following the step 202, the STB 101 executes the microcode identified at the step 202.

This microcode, whatever its version, has analysis instruction codes corresponding to the analysis of the data received by the input zones in order to detect the presence therein of a new version of the microcode or an application that the STB is capable of implementing. In one variant, these analysis instruction codes are recorded in the memory 102a, and the microcode then comprises instruction codes enabling it to invoke the analysis instruction codes.

These analysis instruction codes are therefore implemented at regular intervals or upon predetermined events by the microcode in a step 204 for detecting the availability of a new version of the microcode. One event that can give rise to the implementing of the analysis instruction codes is the putting of the STB 101 into operation.

If no new version is detected at the step 204, then the STB goes from the step 204 to the step 203 in which it continues executing the microcode selected at the step 202. If not, the STB 204 passes to an optional step for authenticating the detected version of the microcode. In this step, the STB 101 also makes a check to see if the available microcode is not already present in the memory 101, in which case it is unnecessary to record it again.

Let us assume that the STB 101, upon starting up, has detected a new available microcode version broadcast by the channels, i.e. that the STB 101 has detected this new version through one of its tuners. The STB 101 then allocates one of its tuners to the management of this new version of its microcode. This means that this tuner and more generally the input device through which the new version has been detected is no longer available for anything other than the management of the new version of the microcode.

In as much as the STB 101 has two tuners or inasmuch as the input device through which the new version of the microcode has been detected is not a tuner, there is always a tuner available to enable the STB 101 to assume a portion or even all of its functions and therefore respond to prompting by the remote control 120 even while the STB 101 is in the process of managing the reception of a new version of the microcode.

For example, the user may continue to parameterize the tuner that is not used to manage the reception of the microcode to select a channel that he wishes to view. From the user's viewpoint, the STB 101 is therefore still functional. If the user were to try to implement a function requiring the availability of the two tuners, it would have a message sent to it informing it that this function is no longer available up to the end of the management of the new version of the microcode. In one variant, in this case, the STB 101 interrupts the management of the new version of the microcode to resume it subsequently. In one variant, the tuner used for the reception of the microcode is released so that the user can use the function that he wishes.

In practice, a new version is digitally signed with a secret key known to the STB 101. The STB 101 is therefore capable of determining if the new version of the detected microcode is truly authentic.

If this is not the case, the STB 101 passes to the step 203. If the new version is authentic, then the STB 101 passes to a recording step 206.

In the step 206, the STB determines a location for recording the new version of the microcode detected at the step 204. This location is in the memory 102, following the last version of the microcode that has been recorded. If the space in the memory 102 is insufficient, then the chosen location is that of the oldest version of the microcode.

For this management of the location of the new version of the microcode, the memory 102 is seen by the active microcode of the STB 101 as a disk endowed with a given capacity. The active microcode therefore comprises or can invoke instruction codes for the management of the disk. These instruction codes correspond to the basic services rendered by an operating system to an application. These services comprise at least the enumeration of the contents of the memory, the erasure of a file from the memory, and the recording of a file in the memory.

The STB 101 therefore has access at all times to the contents of the memory 102. These contents are seen as a set of files. Each file has properties such as a version number. This version number enables the files to be presented to the user but also makes it possible to determine whether a version available through an input device is not already recorded in the memory 102.

At the end of the step 206, a new version of the microcode is available in the memory 102. Either the STB 101 immediately alerts the user or the STB 101 updates a parameter of the memory 109 informing the STB 101 that it must alert the user to the availability of a new version of the microcode the next time the STB 101 is put into operation. In the case of an immediate or deferred alert, this alert takes the form of an OSD (on-screen display) message overlaid on the image being viewed by the user of the STB 101.

This user can then decide, through the remote control unit 120, to take account of this message or to ignore it. Ignoring it validates the fact, from the viewpoint of the STB, that the user has been informed of the availability of a new version of the microcode. This means that the STB 101 will no longer alert the user to the availability of this new microcode.

If the user takes account of this message, this gives rise to the display of a new OSD message listing the available microcode versions and enabling the user to select the version that he wishes to activate. Each microcode is presented as being associated with a name and/or a version number. If the user selects a microcode different from the one currently being executed, that causes the updating of the memory 109 with the identifier of the selected microcode and, immediately after this updating, the re-starting of the STB 101. When this re-starting takes place, it is the microcode selected just before that will be executed. This microcode is one of those present in the memory 102.

It must be specified here that the selection of the microcode may be done at any time by the right combination of keys on the remote control 120.

The user is therefore able to take account of a message indicating the end of the downloading of the microcode in several ways:
 one option allows him to re-start the STB 101 immediately with a new microcode,
 one option allows him to state that the next manual re-start of the
STB will be done with the new microcode. In this case, the user continues to use the STB normally.

With the invention, the STB 101 can therefore implement several microcode versions. In one variant of the invention, the microcode according to the invention has a detection step implemented during the activation of any input device whatsoever. Thus, when a USB peripheral is connected, the microcode starts by detecting whether this peripheral has an authenticated version of the microcode to be recorded in the memory 102. This is also the case with the introduction of a DVD into a DVD player comprising the STB 101 or connected to the STB 101.

The invention claimed is:

1. Method for downloading a new version of application firmware into a television receiver/decoder comprising at least first and second tuners within the television receiver/decoder, the following steps being implemented by the television receiver/decoder device operating a current version of the firmware:
 while the first tuner is receiving a first television program, detecting information regarding availability of the new version of the firmware, the detected information being independent from information contained in the received first television program;
 determining whether the second tuner within the television receiver/decoder is receiving a second television program;
 when the second tuner is not receiving the second television program, allocating the second tuner exclusively for management of the new version of the firmware;
 while the first tuner is receiving the first television program and the second tuner is not receiving the second television program, receiving the new version of the firmware using the second tuner;
 recording the new version of the firmware in a zone of a backup medium, the backup medium being separate from a medium storing the current version of the firmware such that multiple versions of the firmware, not including the new version, are stored in respective multiple zones of the backup medium;
 determining whether available space in the backup medium is sufficient for recording the new version; and
 responsive to a determination that the available space in the backup medium is insufficient for recording the new version, deleting an oldest version of the firmware before recording the new version.

2. Method according to claim 1 further comprising a step for updating a configuration memory to have content designating that the new version of the firmware to be executed when the television receiver/decoder is started.

3. Method according to claim 1, wherein the backup medium is a mass storage peripheral integrated into the television receiver/decoder.

4. Method according to claim 1, wherein the recording of the new version of the firmware is secured at least by the authentication of the data source delivering data corresponding to the new version of the firmware.

5. Method for downloading a new version of application firmware into a television receiver/decoder comprising at least first and second tuners within the television receiver/decoder, the following steps being implemented by the television receiver/decoder device operating a current version of the firmware:
 while the first tuner is receiving a first television program, detecting information regarding availability of the new version of the firmware, the detected information being independent from information contained in the received first television program;
 determining whether the second tuner within the television receiver/decoder is receiving a second television program;
 when the second tuner is not receiving the second television program, allocating the second tuner exclusively for management of the new version of the firmware;
 while the first tuner is receiving the first television program and the second tuner is not receiving the second television program, receiving the new version of the firmware using the second tuner;

recording the new version of the firmware in a zone of a backup medium, the backup medium being separate from a medium storing the current version of the firmware such that multiple versions of the firmware, not including the new version, are stored in respective multiple zones of the backup medium;

determining whether available space in the backup medium is sufficient for recording the new version;

responsive to a determination that the available space in the backup medium is insufficient for recording the new version, deleting an oldest version of the firmware before recording the new version;

receiving, by the second tuner, a request to tune to a third television program while the second tuner is receiving the new firmware;

in response to the request, suspending the receiving of the new version of the firmware and tuning the second tuner to receive the third television program; and after the completion of the third television program, resuming the receiving of the new version of the firmware.

6. Method according to claim 1, further including the steps of:

after downloading the new version of the firmware into the backup medium, displaying a list of all different available versions of the firmware stored in the backup medium, including versions older than a current version, the different available versions of the firmware having respectively different names and providing respectively different functions, and displaying a request for a selection of one of the displayed versions; and in response to the selection of the one displayed version of the firmware that is different from the current version of the firmware, updating the configuration memory to designate the selected version of the firmware to be executed when the television receiver/decoder is started.

7. Method according to claim 5 further comprising a step for updating a configuration memory to have content designating that the new version of the firmware to be executed when the television receiver/decoder is started.

8. Method according to claim 5, wherein the backup medium is a mass storage peripheral integrated into the television receiver/decoder.

9. Method according to claim 5, wherein the recording of the new version of the firmware is secured at least by the authentication of the data source delivering data corresponding to the new version of the firmware.

10. A television receiver/decoder comprising a processor, first and second tuners, and a memory storing instructions that, when executed, cause the receiver/decoder to:

while the first tuner is receiving a first television program, detect information regarding availability of a new version of the firmware, the detected information being independent form information contained in the received first television program;

determine whether the second tuner within the television receiver/decoder is receiving a second television program;

when the second tuner is not receiving the second television program, allocate the second tuner exclusively for management of the new version of the firmware;

while the first tuner is receiving the first television program and the second tuner is not receiving the second television program, receive the new version of the firmware using the second tuner;

record the new version of the firmware in a zone of a backup medium, the backup medium being separate from a medium storing the current version of the firmware such that multiple versions of the firmware, not including the new version, are stored in respective multiple zones of the backup medium;

determine whether available space in the backup medium is sufficient for recording the new version; and responsive to a determination that the available space in the backup medium is insufficient for recording the new version, delete an oldest version of the firmware before recording the new version.

11. A non-transitory computer readable medium including a computer readable program, wherein the computer readable program when executed by a processor of a television receiver/decoder causes the processor to:

while a first tuner is receiving a first television program, detect information regarding availability of a new version of the firmware, the detected information being independent form information contained in the received first television program;

determine whether a second tuner within the television receiver/decoder is receiving a second television program;

when the second tuner is not receiving the second television program, allocate the second tuner exclusively for management of the new version of the firmware in response to detecting the availability of the new version of the firmware;

while the first tuner is receiving the first television program and the second tuner is not receiving the second television program, receive the new version of the firmware using the second tuner;

record the new version of the firmware in a zone of a backup medium, the backup medium being separate from a medium storing the current version of the firmware such that multiple versions of the firmware, not including the new version, are stored in respective multiple zones of the backup medium;

determine whether available space in the backup medium is sufficient for recording the new version; and responsive to a determination that the available space in the backup medium is insufficient for recording the new version, delete an oldest version of the firmware before recording the new version.

12. Method according to claim 1, wherein the new version of the firmware is not recorded in the zone of the backup medium, if the new firmware is already present in the backup medium.

13. Method according to claim 1, wherein a message is displayed to a user of the receiver/decoder informing the user that a function requiring availability of the first and second tuners is not available until an end of the management of the new version of the firmware, if the user attempts to implement the function.

14. Method according to claim 1, wherein the information regarding availability of the new version of the firmware is detected, responsive to a starting of the receiver/decoder.

15. Method according to claim 1, wherein the information regarding availability of the new version of the firmware is detected, responsive to an activation of an input device of the receiver/decoder.

16. Method according to claim 6, wherein the list is displayed to a user of the receiver/decoder as an alert overlaying one or more images of the first television program being viewed by the user.

17. Method according to claim 6, wherein the selection of the one displayed version is performed by a certain combination of keys pressed on a remote control by a user of the receiver/decoder.

* * * * *